(12) United States Patent
Gauld

(10) Patent No.: US 10,445,993 B1
(45) Date of Patent: Oct. 15, 2019

(54) INTERNET-OF-THINGS (IOT) DEVICE/PLATFORM FOR CROWD INTERACTION PROCESSING

(71) Applicant: NCR Corporation, Duluth, GA (US)

(72) Inventor: Frank Joseph Lamont Gauld, Edinburgh (GB)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 15/940,834

(22) Filed: Mar. 29, 2018

(51) Int. Cl.
*G08B 5/36* (2006.01)
*G08C 17/00* (2006.01)
*G08B 25/12* (2006.01)

(52) U.S. Cl.
CPC ............... *G08B 5/36* (2013.01); *G08B 25/12* (2013.01); *G08C 17/00* (2013.01)

(58) Field of Classification Search
CPC ........ G08B 21/02; G06F 17/20; G06Q 10/02; A04Q 7/20; H04W 4/04; H04W 4/21; H04L 29/08
USPC ................ 340/6.1, 10.1–10.5; 455/517, 575; 463/39, 40
See application file for complete search history.

(56) References Cited

U.S. PATENT DOCUMENTS

| | | | | |
|---|---|---|---|---|
| 6,650,903 B2 * | 11/2003 | Inselberg | ........... | G06Q 30/0242 455/3.06 |
| 9,792,799 B2 * | 10/2017 | Britt | ................... | G08B 21/0205 |
| 9,836,755 B2 * | 12/2017 | Zamer | ................ | G06Q 30/0201 |
| 9,933,768 B2 * | 4/2018 | Britt | ........................ | G08C 17/02 |
| 9,959,689 B2 * | 5/2018 | Pulitzer | .................. | G06Q 10/02 |
| 10,176,486 B2 * | 1/2019 | Pulitzer | .................... | H04W 4/21 |
| 2018/0324048 A1 * | 11/2018 | Lee | ..................... | H04L 41/0889 |

* cited by examiner

*Primary Examiner* — Nam V Nguyen
(74) *Attorney, Agent, or Firm* — Schwegman, Lundberg & Woessner

(57) ABSTRACT

An Internet-Of-Things (IoTs) button device includes a button. A server provides custom user configuration of the button device for an event. The server interacts with a display device associated with the event to display on a display of the display device questions, games, competitions, and/or surveys in real time during the event. The button when depressed by a user reports a button identifier and a response signal that is mapped to components of the questions, games, competitions, and/or surveys. Real-time results for the questions, games, competitions, and/or surveys drive the real time displaying of information on the display of the display device during the event.

7 Claims, 4 Drawing Sheets

INTERNET-OF-THINGS (IOT) DEVICE/PLATFORM FOR CROWD INTERACTION PROCESSING

BACKGROUND

Typically when a consumer is attending a large event there is difficulty in interacting with the consumer individually and the consumers as a whole. Consumers typically utilize their phones, which have mobile applications, voice, and text messaging capabilities but because of a limited number of cell towers near the venue of the event, consumers are often unable to connect or obtain any decent level of service during the event. This is because the cell towers only permit a limited number of simultaneous connections and when the upward limit is close to being reached, the level of service for all those consumers that were able to successfully connect is substantially degraded. In most cases, the consumers just put their phones away during the event.

Still, retailers try as best they can to engage the consumers through interactive Tweets™, scoreboard trivia, or games managed by event personnel through cameras and microphones. But because of the technical difficulties in directly interacting with the consumer, this interaction has limited participation and provides the retailers with only a minimal amount of coarse-grain information about the consumers as a whole at the event without any ability to directly discern responses from particular consumers.

Additionally because cell connectivity is sparse at these events, most consumers at the event do not even attempt to engage. Furthermore, phones in a crowd are hard to get out of one's pocket or coat and most consumers do not even attempt to participate.

However, these events have a potential to provide a wealth of information to retailers about the type of consumer, who is willing to pay for expensive tickets and travel to the event while battling congested traffic to the event and back home after the event.

SUMMARY

In various embodiments, methods and a device for an Internet-Of-Things (IoTs) device/platform for crowd interaction processing are presented.

According to an embodiment, a method for a crowd interaction processing through an IoT device is presented. More particularly, An IoT button device is configured for an event. A button activation response is received from the IoT button device during the event. The button activation response is tabulated with other button activation responses received from other IoT button devices during the event as a tabulated result. Finally, a display device associated with the event is caused to alter displayed effects or displayed information on a display of the display device based on the tabulated result.

DETAILED DESCRIPTION

Figure 1:
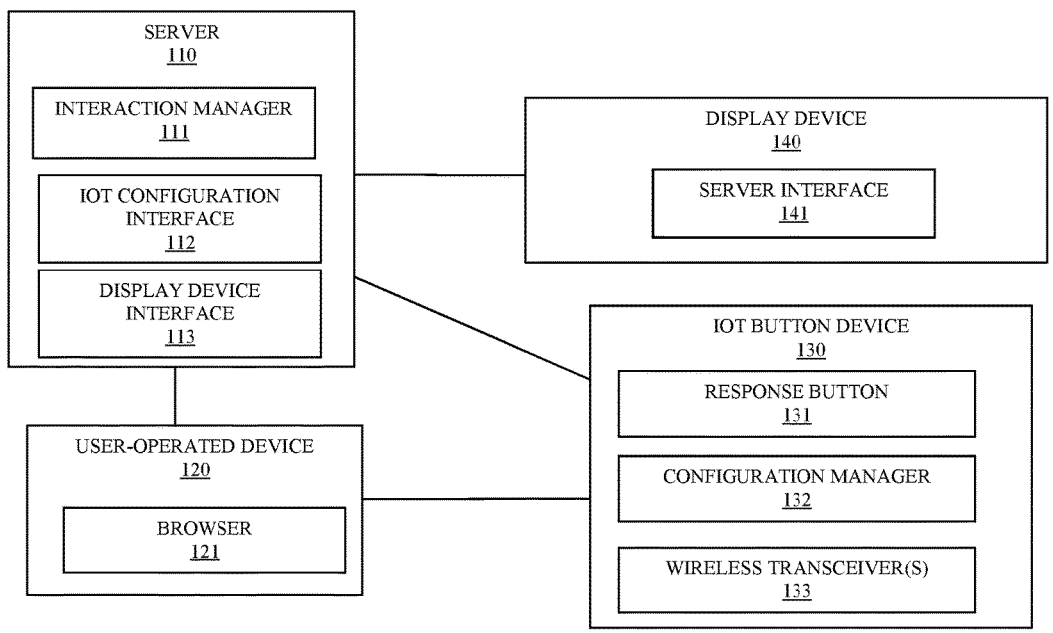
FIG. 1 is a diagram of an IoT platform system for a crowd interaction processing, according to an example embodiment.

FIG. 1 is a diagram of an IoT platform system 100 for a crowd interaction processing, according to an example embodiment. The various components are illustrated and the arrangement of the components is presented for purposes of illustration only. It is to be noted that other arrangements with more or less components are possible without departing from the IoT crowd interaction teachings presented herein and below.

The techniques, methods, and system presented herein and below for IoT crowd interaction processing can be implemented in whole or in part in one, all, or some combination of the components shown with the system 100. The techniques and methods are programmed as executable instructions in memory and/or non-transitory computer-readable storage media and processed on one or more processors associated with the various components.

As used herein the terms "customer," "consumer," and "user" may be used synonymously and interchangeably.

A "display device" as used herein refers to a device that includes a processor, memory, storage, software that executes on the processor, and at least one interfaced hardware display to which the content is visually rendered in one or more display screens within the display.

In an embodiment, the display device is: a digital sign, a television, or a processor-enabled display monitor.

The system 100 includes a server 110 having at least one hardware processor, memory, and non-transitory computer-readable storage. The processor executes instructions representing an interaction manager 111, an IoT configuration interface 112, and a display device interface 113.

The system 100 also includes a user-operated device 120 having at least one hardware processor, memory, and non-transitory computer-readable storage. The processor executes instructions represent a browser 121.

The system 100 further includes an IoT button device 130. The device 130 includes at least one hardware processor, memory, and non-transitory computer-readable storage. The processor executes instructions representing a configuration manager 132. The IoT button device 130 also includes a physical depressable button 131 and at least one wireless transceiver 133.

Finally, the system 100 includes at least one display device 140. The display device includes at least one hardware processor, memory, non-transitory computer-readable storage, and a display. The processor executes instructions representing a server interface 141.

In an embodiment, the IoT button device 130 is the size of a wearable processing device, such as a watch or smaller, and the IoT button device 130 includes an attachment mechanism (such as a clip or reusable adhesive) that allows the IoT button device 130 to be attached to a person's clothing, a key chain, and/or a mobile device (phone or tablet) carried by the person.

The IoT button device 130 includes a battery for powering the processor and the transceiver(s) 133. In an embodiment, the IoT button device 130 further includes a power on and power off switch. In an embodiment, the IoT button device 130 includes at least one color Light Emitting Diode (LED) to indicate when the device 130 is powered on; to provide a colored emitted light as user-feedback to activating (depressing) the response button 131; and to indicate when the device 130 is connected to a wireless network.

Initially, the IoT button device 130 is configured for connecting to wireless connection through the transceiver 133.

In an embodiment, the transceiver emits a small range Wi-Fi signal or Low Energy Bluetooth® signal that is connectable to by a wireless transceiver of the user-operated device 120; the user is provided an Internet Protocol address for accessing a configuration page housed on the IoT button device through the browser 121 to configure the transceiver 133 for using a wireless connection that the user-operated device 120 uses.

In an embodiment, the user accesses the browser 121 to connect to the IoT configuration interface 112 of the server 110. A browser plugin or a mobile application is downloaded to the user-operated device 120. The plugin or mobile application interacts with and configures the IoT button device's transceiver 133 for connecting to a plurality of user-defined wireless networks.

The IoT button device 130 is preconfigured to send a depressed button signal when the button 131 is depressed over a connected wireless network to the interaction manager 111 of the server 110 (such as through a preconfigured website for accessing the interaction manager 111. The activate button signal can include an identifier for the button device 130 and a time and date that the button 131 was activated.

In an embodiment, the signal can also include a physical location for the button device 130 when the button device 130 is preconfigured with location services or when the button device 130 can obtain the location from any connected wireless network or obtain the location from the user-operated device's location services through an IoT mobile application installed on the user-operated device 120.

During initial configuration of the IoT button device 130, the user uses the browser 121 to interact with the IoT configuration interface 112 and provide an IoT button device unique identifier that is registered to the user. This allows the IoT configuration interface 112 to link a user account for the user to the specific IoT button device 130 and allows the IoT configuration interface 112 to install software and communicate with the button device 130 through a mobile application pushed to the user-operated device 120. Updates to the software can be obtained on the button device 130 in a similar manner through the mobile application that executes on the user-operated device 120.

The IoT configuration interface 112 also includes custom interfaces for events or venues that the user can access through the browser 121 or that the mobile application of the user-operated device 120 can be used to inform the user about. These custom interfaces can be accessed by the user to report events that the user plans to attend or watch on television (a type of display device 140). The user can be asked to report a specific seat location for the event through the customer interfaces. Furthermore, the configuration interface 112 can, in response, to the reporting by the user for the event, push any wireless connection settings known for a venue of the event (when being attended in person by the user) in advance of the event to the configuration manager 132 of the IoT button device 130, such that when the transceiver 133 reports a signal being received for the wireless network of the venue, the configuration manager 132 automatically connects to the wireless network with the settings.

Games, surveys, and other event-specific interactions can be managed through the interaction manager 111 by a retailer or enterprise and set up for reporting to a retailer or enterprise server. The server interface 141 of the display device 140 allows specific games, surveys, and other event-specific interactions to be reported when started to the interaction manager 111. This can also be done without the server interface indirectly through the enterprise server that is running questions, competitions, surveys and/or games for presentation in real time on a display of the display device 140.

During operation, a user attends or watches an event from a television (a type of display device 140). Questions, competitions, surveys, and games are managed by an enterprise server and its software and displayed on the display device 140 (digital sign at the venue of the event or overlaid on a television during a broadcast of the event). When the questions, competitions, surveys and games are displayed, the server interface 141 (or the enterprise server) reports identifiers for components of the questions, competitions, surveys, and games to the interaction manager 111. Simultaneously, when the user activates (depresses) the response button 131 in response to the questions, competitions, surveys, and games, the button device 130 uses the transceiver 133 and the wireless network that it is connected to (the preconfigured venue wireless network when the user is at the venue or the user-operated device's wireless network when the user is elsewhere during the event watching in real time on television) and reports the button identifier for the button device 130, the depressed button signal, a date and time, and, optionally, a location of the button device 130 to the interaction manager 111.

The interaction manager 111 tabulates button responses received for components of the questions, competitions, surveys, and games and provides them in real time to the display device interface 113. The display device interface 113 can send the tabulated results along with the user names, user identifiers associated with each or the tabulated responses (obtainable through the registered users to each button device 130), and any preconfigured seat location at the event for each user (if known) to the enterprise server that is running the questions, competitions, surveys, and games in real time on the display device 140 during the event. The enterprise server can then provide tabulated real-time results to the questions, competitions, surveys, and games to the display device 140 for real-time rendering and displaying on the display of the display device 140 during the event. Users whose seat location are known can be used during any of the games or competitions by the enterprise server to select winners and/or provided tabulated results on the display of the display device 140 based on seat locations (such as section and aisle).

The games and competitions are endless and can be managed through the enterprise server. Results are tabulated in a clear time context from the users participating in the event. Users at the event can be distinguished from users not at the event but watching on television or through a live stream on a computer-device (another type of display device). For example, the first 500 users that click the button 131 receive some reward from the enterprise or a retailer that the enterprise is running the competition for. Respond to a fan chant with a button click and if 10000 clicks are received special lights or fireworks are simulated on the display of the display device 140. Click the button 131 during an existing play, such as a goal by your favorite team and a visual indicator on the display of the display device 140 is increased proportionally. Games can be played between home fans versus visitor fans, between one section of a stadium versus a different section of the stadium, etc. A Most Valuable Player (MVP) can be selected in real time by the fans at the event.

In an embodiment, the button device 130 can be configured by the user through the customer interfaces of the configuration interface 112 to associate the user with being a fan of a specific team associated with the event. Such that games and questions can be asked of each team during the event and tabulated results provided based on fan affiliations.

The enterprise server can utilize the button identifiers, event, venue, questions, games, competitions, and surveys to interactively and in real time drive visual and audio effects during the event on the display device 140. Furthermore, rich data metrics for each participating user can be gathered and provided to the retailer during and at the conclusion of game play. Such data can identify each user and that user's individual responses made with the button 131 within the context of the questions, games, competitions, and surveys during the event.

In an embodiment, the button device 130 is a modified version of the AMAZON DASH® button that includes the customer configuration through the configuration interface 112 and interaction through the questions, games, competitions, and surveys during events.

In an embodiment, the display device 110 is a digital sign, such as but not limited to a scoreboard at a venue.

In an embodiment, the display device 110 is a television.

In an embodiment, the display device 110 is a computing device with an attached display.

In an embodiment the IoT button device 130 includes two or more buttons 131. Each button includes a color or a label and the questions, competitions, games, and surveys provide selections for the user to make using the different buttons 131.

In an embodiment, the button 131 is configured to be depressed multiple times in succession to distinguish selections made by the user to elements/component pieces of the questions, the competitions, the games, and the surveys. The number of successive button depressions representing a particular selection of the user. In an embodiment, the button device 130 waits a configured amount of time (for example, 1 second) after a first depression of the button 131 to determine if multiple depressions are being made as a single selection and after a last depression of the button 131 having the elapsed period of time, the button device 130 transfers the determined selection over the wireless connection of the device 130 through the transceiver 133 to the interaction manager 111.

In an embodiment, the event is one of: a sporting event, a concert, a television broadcast, a political rally, an organizational/governmental meeting, a theatrical presentation, and other circumstances during which a large crowd is present with access to a display device 140.

These embodiments and other embodiments are now discussed with reference to the FIGS. 2-4.

Figure 2:
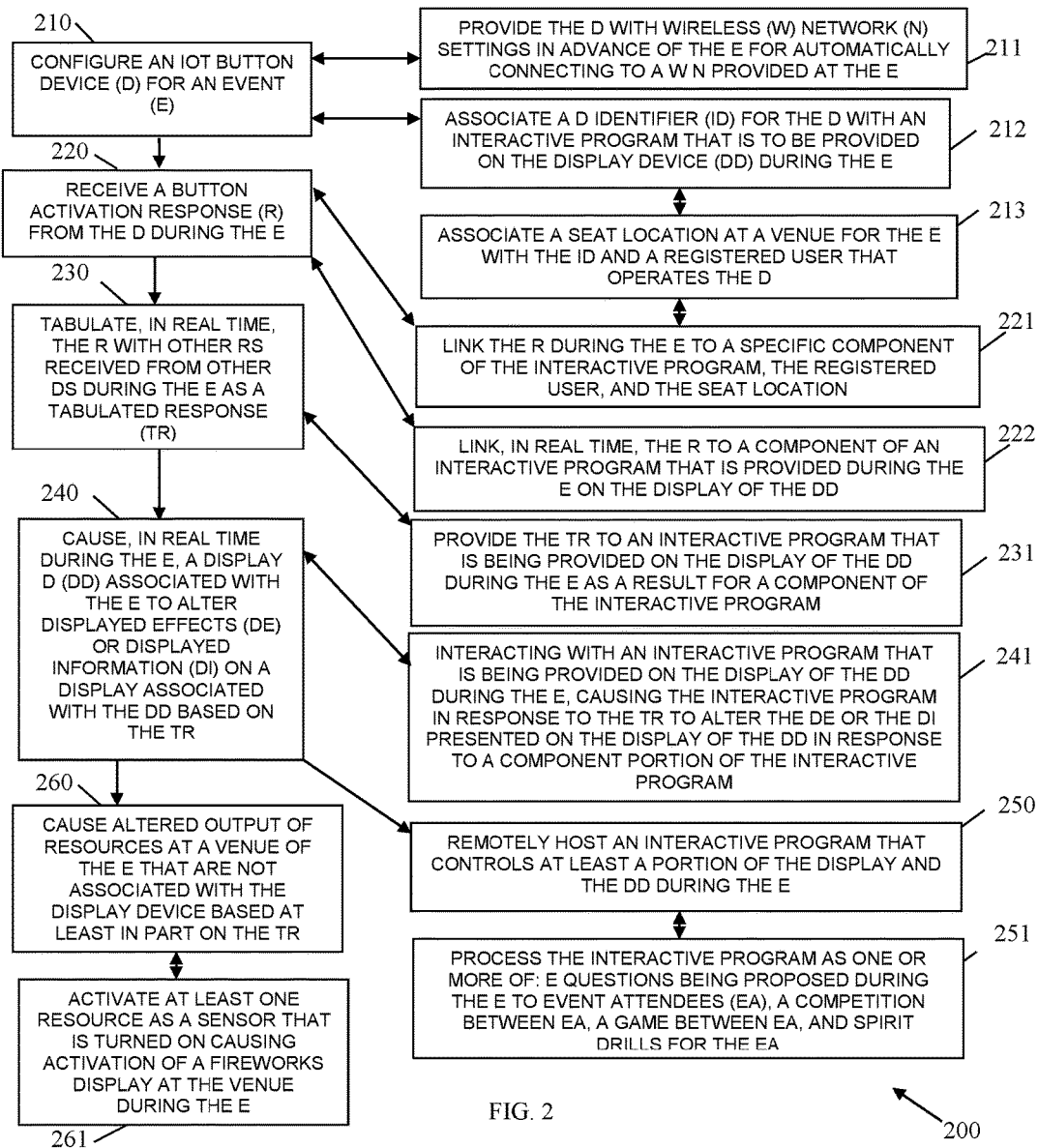
FIG. 2 is a diagram of a method for a crowd interaction processing through an IoT device, according to an example embodiment.

FIG. 2 is a diagram of a method 200 for IoT crowd interaction processing, according to an example embodiment. The software module(s) that implements the method 200 is referred to as an "IoT crowd interaction manager." The IoT crowd interaction manager is implemented as executable instructions programmed and residing within memory and/or a non-transitory computer-readable (processor-readable) storage medium and executed by one or more processors of a device. The processor(s) of the device that executes the IoT crowd interaction manager are specifically configured and programmed to process the IoT crowd interaction manager. The IoT crowd interaction manager has access to one or more networks during its processing. The networks can be wired, wireless, or a combination of wired and wireless.

In an embodiment, the IoT crowd interaction manager is all of, or some combination of 111, 112, and/or 113.

In an embodiment, the device that executes the IoT crowd interaction manager is the server 110.

In an embodiment, the device that executes the IoT crowd interaction manager is a cloud processing environment.

At 210, the IoT crowd interaction manager remotely, over a wireless connection, configures an IoT button device for an event. In an embodiment, the IoT button device is the device 130 and/or the device 400 (discussed below with the FIG. 4).

In an embodiment, at 211, the IoT crowd interaction manager provides the IoT button device with wireless network settings in advance of the event for automatically connection to a wireless network provided at the event.

In an embodiment, at 212, the IoT crowd interaction manager associated an IoT button device identifier for the IoT button device with an interactive program that is to be provided on a display device during the event.

As used herein, an "interactive program" is: questions, competitions, games, surveys, and/or spirit cheers driving by a set of executable instructions that can control information and effects of a display device during the event.

In an embodiment of 212 and 213, the IoT crowd interaction manager associates a seat location at a venue for the event with the IoT device identifier and a registered user that operates the IoT button device.

At 220, the IoT crowd interaction manager receives a button activation response from the IoT button device during the event.

In an embodiment of 213 and 220, at 221, the IoT crowd interaction manager links the button activation response during the event to a specific component of the interactive program, the registered user, and the seat location of the registered user.

In an embodiment, at 222, the IoT crowd interaction manager links, in real time, the button activation response to a component of an interactive program that is provided during the event on a display of the display device.

At 230, the IoT crowd interaction manager tabulates, in real time, the button activation response with other button activation responses received from other IoT button devices during the event as a tabulated response.

In an embodiment, at 231, the IoT crowd interaction manager provides the tabulated response to an interactive program that is being provided on the display of the display device during the event as a result for a component of the interactive program.

At 240, the IoT crowd interaction manager causes, in real time during the event, a display device that is associated with the event to alter displayed effects or displayed information on a display associated with the display device based on the tabulated response.

According to an embodiment, at 250, the IoT crowd interaction manager remotely hosts an interactive program that controls at least a portion of the display and the display device during the event.

In an embodiment, at 251, the IoT crowd interaction manager processes the interactive program as one or more of: event questions being proposed interactively during the event to event attendees, a competition being conducted at the event between the event attendees, a game between the event attendees, and spirit drills for the event attendees.

In an embodiment, at 260, the IoT crowd interaction manager causes altered output of resources at a venue of the event that are not associated with the display device based at least in part on the tabulated response.

In an embodiment, at 261, the IoT crowd interaction manager activates at least one resource as a sensor that is turned on, causing activation of a fireworks display at the venue during the event.

Figure 3:
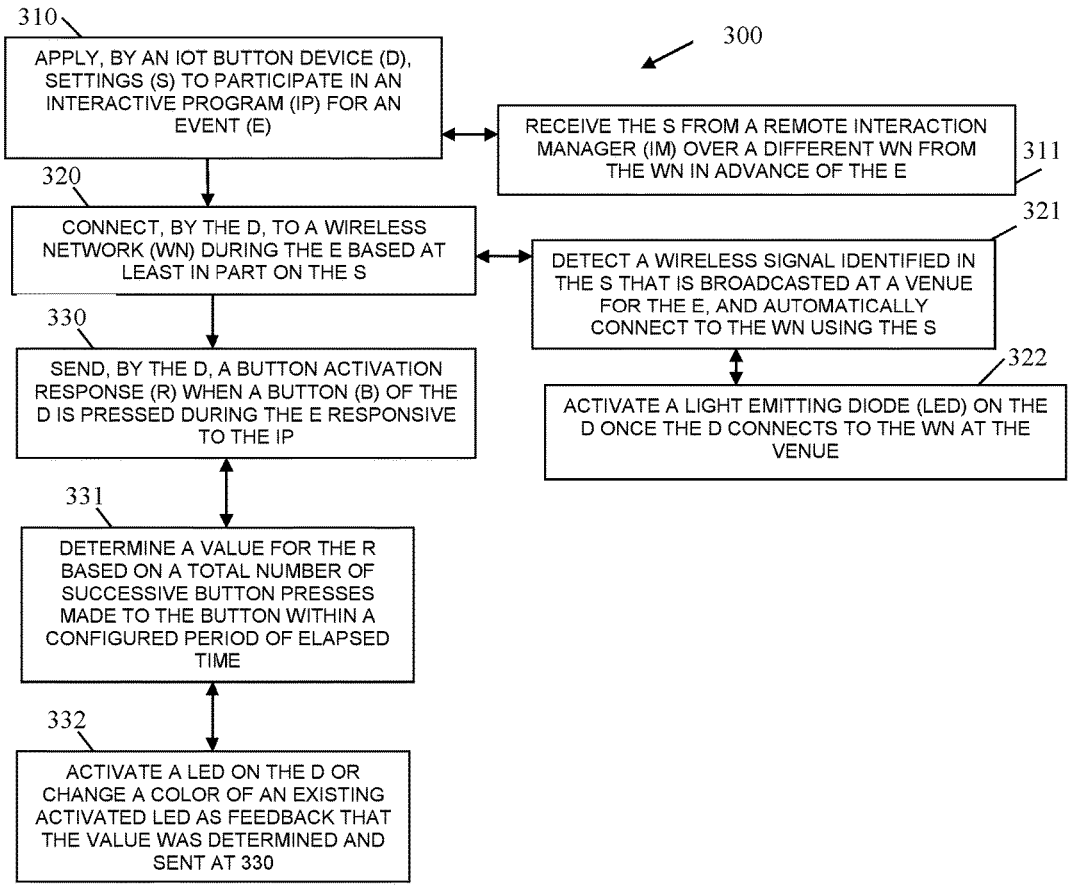
FIG. 3 is a diagram of another method for a crowd interaction processing through an IoT device, according to an example embodiment.

FIG. 3 is a diagram of another method 300 for IoT crowd interaction processing, according to an example embodiment. The software module(s) that implement the method 300 is referred to herein as an "IoT device agent." The IoT device agent is implemented as executable instructions and programmed within memory and/or a non-transitory computer-readable (processor-readable) storage medium that executes on one or more processors of a device. The processors of the device are specifically configured to execute the IoT device agent. The IoT device agent has access one or more networks; the networks are wireless.

In an embodiment, the IoT device agent is the configuration manager 132.

In an embodiment, the device that executes the IoT device agent is the IoT button device 130.

At 310, the IoT device agent applies settings to participate in an interactive program for an event.

In an embodiment, at 311, the IoT device agent receives the settings from a remote interaction manager over a different wireless network from the wireless network (discussed at 320) in advance of the event.

In an embodiment, the remote interaction manager is one or more of: the interaction manager 111, the IoT configuration interface 112, and/or the method 200.

At 320, the IoT device agent connects to a wireless network during the event based at least in part on the settings.

In an embodiment, at 321, the IoT device agent detects a wireless signal identified in the settings that is broadcasted at a venue for the event and automatically connects to that wireless network using the settings.

In an embodiment of 321 and at 322, the IoT device agent activates a Light Emitting Diode (LED) on the IoT button device once the IoT button device connects to the wireless network at the venue.

At 330, the IoT device agent sends a button activation response when a button of the IoT device is pressed during the event and responsive to the interactive program. In an embodiment, the button activation response is sent to the one or more of: the interaction manager 111 and/or the method 200.

In an embodiment, at 331, the IoT device agent determines a value for the button activation response based on a total number of successive button presses made to the button within a configured period of elapsed time.

In an embodiment of 331 and at 332, the IoT device agent activates a LED on the IoT button device or changes a color of an existing activated LED as feedback that the value was determined and sent at 330.

Figure 4:
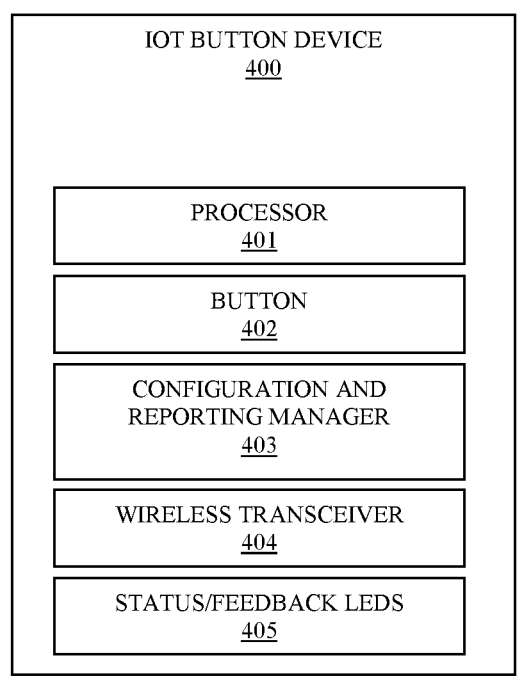
FIG. 4 is a diagram of an IoT device for a crowd interaction processing, according to an example embodiment.

FIG. 4 is a diagram of an IoT button device 400 for a crowd interaction processing, according to an example embodiment. Some components of the device 400 are programmed and reside within memory and/or a non-transitory computer-readable medium and execute on one or more processors of the device 400. The device 400 also has access and can communicate over one or more networks; and the networks are wireless.

The IoT button device 400 is configured and programmed to perform the processing discussed above with the FIGS. 1 (with respect to the button device 130) and 3.

The device 400 includes a processor 401, a button 402, a configuration and reporting manager 403, and a wireless transceiver 404. In an embodiment, the device 400 further includes one or more connection status and/or button activation feedback LEDs.

In an embodiment, the device 400 is the IoT button device 130.

The processor 402 is configured to executing instructions from non-transitory computer readable media representing the configuration and reporting manager 403.

In an embodiment, the configuration and reporting manager 403 is some, all, of the configuration manager 132 and/or the method 300.

The configuration manager 402 executes on the processor 401 and is configured to: (i) apply settings for the IoT button device 400 to connect to a wireless network through the wireless transceiver 404, and (ii) send a button activation response when the button 402 is pressed to a remote interaction manager over the wireless network responsive to an interactive program that controls a display device during an event.

In an embodiment, the remote interaction manager is one or more of: the interaction manager 111, the IoT configuration interface 112, and/or the method 200.

It should be appreciated that where software is described in a particular form (such as a component or module) this is merely to aid understanding and is not intended to limit how software that implements those functions may be architected or structured. For example, modules may be illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors of a single device, or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:
1. A method, comprising:
configuring an Internet-Of-Things (IoT) button device for an event;
receiving a button activation response from the IoT button device during the event;

tabulating, in real time, the button activation response with other button activation responses received from other IoT button devices during the event as a tabulated result;

causing, in real time during the event, a display device associated with the event to alter displayed effects or displayed information on a display associated with the display device based on the tabulated result, wherein causing further includes causing altered output of resources at a venue of the event that are not associated with the display device based at least in part on the tabulated response causing further includes activating at least one resource as a sensor that is turned on causing activation of fireworks at the venue during the event.

2. The method of claim 1, wherein configuring further includes providing the IoT button device with wireless network settings in advance of the event for automatically connecting to a wireless network provided at the event.

3. The method of claim 1, wherein configuring further includes associating an IoT button device identifier for the IoT button device with an interactive program that is to be provided on the display device during the event.

4. The method of claim 3, wherein associating further includes associating a seat location at a venue of the event with the IoT button device identifier and a registered user that operates the IoT button device.

5. The method of claim 4, wherein receiving further includes linking the button activation response during the event to a specific component of the interactive program, the registered user, and the seat location.

6. The method of claim 1, wherein receiving further includes linking, in real time, the button activation response to a component of an interactive program that is being provided during the event on the display of the display device.

7. The method of claim 1, wherein tabulating further includes providing the tabulated response to an interactive program that is being provided on the display of the display device during the event as a result for a component of the interactive program.

* * * * *